(12) United States Patent
Erceg

(10) Patent No.: US 8,320,848 B2
(45) Date of Patent: Nov. 27, 2012

(54) METHOD AND SYSTEM FOR DIVERSITY PROCESSING INCLUDING USING DEDICATED PILOT METHOD FOR OPEN LOOP

(75) Inventor: Vinko Erceg, Cardiff, CA (US)

(73) Assignee: Broadcom Corporation, Irvine, CA (US)

( * ) Notice: Subject to any disclaimer, the term of this patent is extended or adjusted under 35 U.S.C. 154(b) by 429 days.

(21) Appl. No.: 12/729,443

(22) Filed: Mar. 23, 2010

(65) Prior Publication Data

US 2010/0172304 A1 Jul. 8, 2010

Related U.S. Application Data

(60) Division of application No. 11/403,604, filed on Apr. 13, 2006, now Pat. No. 7,715,806, which is a continuation-in-part of application No. 11/174,303, filed on Jun. 30, 2005, now Pat. No. 7,643,839.

(60) Provisional application No. 60/616,779, filed on Oct. 6, 2004.

(51) Int. Cl.
*H03C 7/02* (2006.01)
(52) U.S. Cl. ............ 455/101; 455/69; 375/267; 370/334
(58) Field of Classification Search ............... 455/67.11, 455/68, 69, 101; 375/267; 370/334
See application file for complete search history.

(56) References Cited

U.S. PATENT DOCUMENTS

| | | | |
|---|---|---|---|
| 3,662,268 A | 5/1972 | Gans et al. | |
| 5,926,503 A | 7/1999 | Kelton et al. | |
| 5,970,053 A | 10/1999 | Schick et al. | |
| 6,078,611 A * | 6/2000 | La Rosa et al. | 375/147 |
| 6,128,276 A | 10/2000 | Agee | |
| 6,128,355 A | 10/2000 | Backman et al. | |
| 6,269,075 B1 | 7/2001 | Tran | |
| 6,738,020 B1 | 5/2004 | Lindskog et al. | |
| 6,754,253 B2 | 6/2004 | Guey | |
| 6,892,059 B1 * | 5/2005 | Kim et al. | 455/272 |
| 6,996,375 B2 * | 2/2006 | Dent et al. | 455/67.16 |
| 6,999,538 B2 | 2/2006 | Kung et al. | |

(Continued)

FOREIGN PATENT DOCUMENTS

EP 1646157 4/2006

OTHER PUBLICATIONS

"Universal Mobile Telecommunications System (UMTS)" ETSI Standards, European Telecommunications Standards Institute, Sophia-Antipo, FR, vol. 3-R1, No. V700, Mar. 2006, XP014034263.
Jan Mietzner and Peter A. Hoeher, University of Kiel, Adaptive Antennas and MIMO Systems for Wireless Communications, Boosting the Performance of Wireless Communication Systems: Theory and Practice of Multiple-Antenna Techniques, IEEE Communications Magazine, Oct. 2004, pp. 40-47.

(Continued)

*Primary Examiner* — Nhan Le
(74) *Attorney, Agent, or Firm* — Garlick & Markison; Bruce E. Garlick

(57) ABSTRACT

Methods and systems for diversity processing including using dedicated pilot method for open loop may include combining a plurality of received WCDMA/HSDPA multipath signals for each diversity transmit antenna to at least one processed diversity signal. The received WCDMA/HSDPA multipath signals may originate from diversity transmit antennas at a base station that may be transmitting information via a closed loop or open loop diversity transmission mode. Open loop symbols may be estimated using information from at least one common pilot channel. At least a portion of the at least one processed diversity signal may be despread from the at least one common pilot channel.

18 Claims, 11 Drawing Sheets

U.S. PATENT DOCUMENTS

| | | |
|---|---|---|
| 7,010,070 B2 | 3/2006 | Li et al. |
| 7,020,446 B2 | 3/2006 | Mehta et al. |
| 7,039,369 B2 | 5/2006 | Horng |
| 7,046,653 B2 | 5/2006 | Nigrin et al. |
| 7,151,951 B2 | 12/2006 | Goransson et al. |
| 7,181,167 B2 | 2/2007 | Onggosanusi et al. |
| 7,218,682 B2 | 5/2007 | Mayor et al. |
| 7,231,007 B2 | 6/2007 | Artamo et al. |
| 7,269,238 B2 | 9/2007 | Lee et al. |
| 7,308,017 B2 * | 12/2007 | Jiang et al. .................... 375/140 |
| 7,366,226 B2 * | 4/2008 | Zhao et al. .................... 375/141 |
| 7,450,632 B2 | 11/2008 | Lim |
| 7,471,694 B2 | 12/2008 | Kent et al. |
| 7,483,675 B2 | 1/2009 | Kent et al. |
| 7,505,539 B2 | 3/2009 | Kent et al. |
| 7,522,562 B2 | 4/2009 | Kent et al. |
| 2003/0031234 A1 | 2/2003 | Smee et al. |
| 2003/0142728 A1 | 7/2003 | Lin |
| 2003/0161390 A1 | 8/2003 | Teague et al. |
| 2003/0231606 A1 | 12/2003 | Wu et al. |
| 2004/0017843 A1 | 1/2004 | Fitton et al. |
| 2004/0131012 A1 | 7/2004 | Mody et al. |
| 2004/0139466 A1 | 7/2004 | Sharma et al. |
| 2004/0235526 A1 | 11/2004 | Kaipainen et al. |
| 2005/0243898 A1 | 11/2005 | Reznik et al. |
| 2006/0072500 A1 | 4/2006 | Kent et al. |
| 2006/0072650 A1 | 4/2006 | Kent et al. |
| 2006/0072652 A1 | 4/2006 | Kent et al. |
| 2007/0015545 A1 | 1/2007 | Leifer et al. |

OTHER PUBLICATIONS

Simon Haykin, McMaster University; Mathini Sellathurai, Yvo De Jong, and Tricia Willink, Communications Research Centre Canada, Adaptive Antennas and MIMO Systems for Wireless Communications, Turbo-MIMO for Wireless Communications, IEEE Communications Magazine, Oct. 2004, pp. 48-53.

David J. Love, Purdue University, Robert W. Heath Jr., University of Texas at Austin and Wiroonsak Santipach and Michael L. Honig, Northwestern University; Adaptive Antennas and MIMO Systems for Wireless Communications, What is the Value of Limited Feedback for MIMO Channels?, IEEE Communications Magazine, Oct. 2004, pp. 54-59.

Quentin H. Spencer, Distribution Control Systems, Inc., Christian B. Peel, Swiss Federal Institute of Technology, A. Lee Swindlehurst, Brigham Young University, Martin Haardt, Ilmenau University of Technology, Adaptive Antennas and MIMO Systems for Wireless Communications, An Introduction to the Multi-User MIMO Downlink, IEEE Communications Magazine, Oct. 2004, pp. 60-67.

Shahab Sanayei and Aria Nosratinia, University of Texas at Dallas, Adaptive Antennas and MIMO Systems for Wireless Communications-Antenna Selection in MIMO Systems, IEEE Communications Magazine, Oct. 2004, pp. 68-73.

Aria Nosratinia, University of Texas, Dallas, Todd E. Hunter, Nortel Networks, Ahmadreza Hedayat, University of Texas, Dallas, Cooperative Communication in Wireless Networks, IEEE Communications Magazine, Oct. 2004, pp. 74-80.

* cited by examiner

METHOD AND SYSTEM FOR DIVERSITY PROCESSING INCLUDING USING DEDICATED PILOT METHOD FOR OPEN LOOP

CROSS-REFERENCE TO RELATED APPLICATIONS/INCORPORATION BY REFERENCE

This application is a divisional application of U.S. application Ser. No. 11/403,604, filed Apr. 13, 2006; which is a continuation-in-part of U.S. patent application Ser. No. 11/174,303, filed on Jun. 30, 2005, and which makes reference to, claims priority to, and claims the benefit of U.S. Provisional Application Ser. No. 60/616,779, filed on Oct. 6, 2004.

This application makes reference to:
U.S. application Ser. No. 11/173,854 filed on Jun. 30, 2005; and
U.S. application Ser. No. 11/173,870 filed on Jun. 30, 2005.

All of the above stated applications are hereby incorporated herein by reference in their entirety.

FIELD OF THE INVENTION

Certain embodiments of the invention relate to communication receivers. More specifically, certain embodiments of the invention relate to a method and system for diversity processing including using a dedicated pilot method for closed loop.

BACKGROUND OF THE INVENTION

Mobile communication has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

The UMTS technology, introduced in 2003, with theoretical data rates as high as 2 Mbps, is an adaptation of the WCDMA 3G system by GSM. One reason for the high data rates that may be achieved by UMTS technology stems from the 5 MHz WCDMA channel bandwidths versus the 200 KHz GSM channel bandwidths. The HSDPA technology is an Internet protocol (IP) based service, oriented for data communications, which adapts WCDMA to support data transfer rates on the order of 10 megabits per second (Mbits/s). Developed by the 3G Partnership Project (3GPP) group, the HSDPA technology achieves higher data rates through a plurality of methods. For example, many transmission decisions may be made at the base station level, which is much closer to the user equipment as opposed to being made at a mobile switching center or office. These may include decisions about the scheduling of data to be transmitted, when data is to be retransmitted, and assessments about the quality of the transmission channel. The HSDPA technology may also utilize variable coding rates. The HSDPA technology may also support 16-level quadrature amplitude modulation (16-QAM) over a high-speed downlink shared channel (HS-DSCH), which permits a plurality of users to share an air interface channel In some instances, HSDPA may provide a two-fold improvement in network capacity as well as data speeds up to five times (over 10 Mbit/s) higher than those in even the most advanced 3G networks. HSDPA may also shorten the roundtrip time between network and terminal, while reducing variances in downlink transmission delay. These performance advances may translate directly into improved network performance and higher subscriber satisfaction. Since HSDPA is an extension of the WCDMA family, it also builds directly on the economies of scale offered by the world's most popular mobile technology. HSDPA may offer breakthrough advances in WCDMA network packet data capacity, enhanced spectral and radio access networks (RAN) hardware efficiencies, and streamlined network implementations. Those improvements may directly translate into lower cost-per-bit, faster and more available services, and a network that is positioned to compete more effectively in the data-centric markets of the future.

The capacity, quality and cost/performance advantages of HSDPA yield measurable benefits for network operators, and, in turn, their subscribers. For operators, this backwards-compatible upgrade to current WCDMA networks is a logical and cost-efficient next step in network evolution. When deployed, HSDPA may co-exist on the same carrier as the current WCDMA Release 99 services, allowing operators to introduce greater capacity and higher data speeds into existing WCDMA networks. Operators may leverage this solution to support a considerably higher number of high data rate users on a single radio carrier. HSDPA makes true mass-market mobile IP multimedia possible and will drive the consumption of data-heavy services while at the same time reducing the cost-per-bit of service delivery, thus boosting both revenue and bottom-line network profits. For data-hungry mobile subscribers, the performance advantages of HSDPA may translate into shorter service response times, less delay and faster perceived connections. Users may also download packet-data over HSDPA while conducting a simultaneous speech call.

HSDPA may provide a number of significant performance improvements when compared to previous or alternative technologies. For example, HSDPA extends the WCDMA bit rates up to 10 Mbps, achieving higher theoretical peak rates with higher-order modulation (16-QAM) and with adaptive coding and modulation schemes. The maximum QPSK bit rate is 5.3 Mbit/s and 10.7 Mbit/s with 16-QAM. Theoretical bit rates of up to 14.4 Mbit/s may be achieved with no channel coding. The terminal capability classes range from 900 Kbit/s to 1.8 Mbit/s with QPSK modulation, and 3.6 Mbit/s and up with 16-QAM modulation. The highest capability class supports the maximum theoretical bit rate of 14.4 Mbit/s.

However, implementing advanced wireless technologies such as WCDMA and/or HSDPA may still require overcoming some architectural hurdles. For example, the RAKE receiver is the most commonly used receiver in CDMA systems, mainly due to its simplicity and reasonable performance and WCDMA Release 99 networks are designed so that RAKE receivers may be used. A RAKE receiver contains a bank of spreading sequence correlators, each receiving an individual multipath. A RAKE receiver operates on multiple discrete paths. The received multipath signals can be combined in several ways, from which maximal ratio combining (MRC) is preferred in a coherent receiver. However, a RAKE receiver may be suboptimal in many practical systems, for example, its performance may degrade from multiple access interference (MAI), that is, interference induced by other users in the network.

In the case of a WCDMA downlink, MAI may result from inter-cell and intracell interference. The signals from neighboring base stations compose intercell interference, which is characterized by scrambling codes, channels and angles of arrivals different from the desired base station signal. Spatial equalization may be utilized to suppress inter-cell interference. In a synchronous downlink application, employing orthogonal spreading codes, intra-cell interference may be caused by multipath propagation. Due to the non-zero cross-correlation between spreading sequences with arbitrary time shifts, there is interference between propagation paths (or RAKE fingers) after despreading, causing MAI and inter-path interference (IPI). The level of intra-cell interference depends strongly on the channel response. In nearly flat fading channels, the physical channels remain almost completely orthogonal and intra-cell interference does not have any significant impact on the receiver performance. On the other hand, the performance of the RAKE receiver may be severely deteriorated by intra-cell interference in frequency selective channels. Frequency selectivity is common for the channels in WCDMA networks.

To combat MAI, linear interference suppression algorithms can be utilized, which are based on linear channel equalization and are suitable for WCDMA/HSDPA systems using long, orthogonal scrambling codes. Due to the difficulties faced when non-linear channel equalizers are applied to the WCDMA downlink, detection of the desired physical channel with a non-linear equalizer may result in implementing an interference canceller or optimal multi-user receiver. Both types of receivers may be prohibitively complex for mobile terminals and may require information not readily available at the mobile terminal. Alternatively, the total base station signal may be considered as the desired signal. However, non-linear equalizers rely on prior knowledge of the constellation of the desired signal, and this information is not readily available at the WCDMA terminal. The constellation of the total base station signal, that is, sum of all physical channels, is a high order quadrature amplitude modulation (QAM) constellation with uneven spacing. The spacing of the constellation changes constantly due to transmission power control (TPC) and possible power offsets between the control data fields, time-multiplexed to the dedicated physical channels. The constellation order may also frequently change due to discontinuous transmission. This makes an accurate estimation of the constellation very difficult.

In this regard, the use of multiple transmit and/or receive antennas may result in an improved overall system performance. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and array gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M-1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR).

However, the widespread deployment of multi-antenna systems in wireless communications, particularly in wireless handset devices, has been limited by the increased cost that results from increased size, complexity, and power consumption. The necessity of providing a separate RF chain for each transmit and receive antenna is a direct factor that increases the cost of multi-antenna systems. Each RF chain generally comprises a low noise amplifier (LNA), a filter, a downconverter, and an analog-to-digital converter (A/D). In certain existing single-antenna wireless receivers, the single required RF chain may account for over 30% of the receiver's total cost. It is therefore apparent that as the number of transmit and receive antennas increases, the system complexity, power consumption, and overall cost may increase. This poses problems for mobile system designs and applications.

Accordingly, a mobile system may be designed with fewer parts. For example, a single antenna with a single RF path rather than dual antennas with dual RF paths. However, this may make signal processing a bit more difficult since there will be fewer independent variables to manipulate.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for diversity processing including using a dedicated pilot method for a closed loop, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1A:
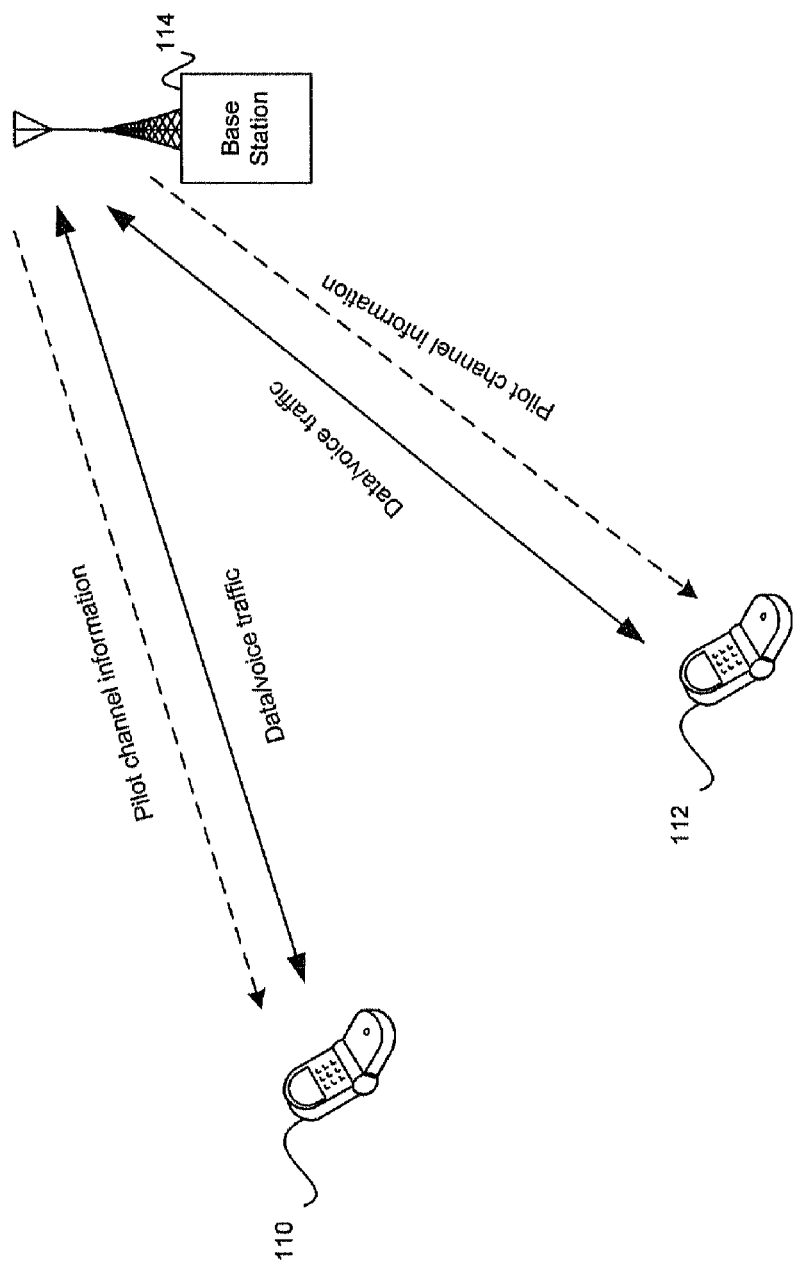
FIG. 1a illustrates an exemplary High Speed Downlink Packet Access (HSDPA) distributed architecture that achieves low delay link adaptation, in connection with utilization of an embodiment of the invention.

Certain embodiments of the invention may be found in a method and system for diversity processing including using a dedicated pilot method for a closed loop. Aspects of the method may comprise combining a plurality of received WCDMA/HSDPA multipath signals for each diversity transmit antenna into at least one processed diversity signal, at least a portion of which may be despread. The received WCDMA/HSDPA multipath signals may originate from diversity transmit antennas at a base station that may be transmitting information via a closed loop or open loop diversity transmission mode. Symbols estimations may be made of symbols transmitted by the diversity transmit antennas. The estimation may comprise projection (or correlation) of the processed signal with respect to information from at least one pilot channel. Projection may be correlation for the purposes of this application.

In accordance with an embodiment of the invention, the closed loop diversity transmission mode may comprise a WCDMA/HSDPA closed loop 1 (CL1) mode. In instances when the base station is transmitting in CL1 mode, partial channel estimates may be generated by projecting (or correlating) each of the processed diversity signals for the base station with respect to dedicated pilot channel information from each of the plurality of diversity transmit antennas at the base station. A weight may then be generated based on the partial channel estimates. A transmit weight may be estimated from the generated weight. The estimation may comprise mapping the generated weight to one of a plurality of weights that may be fed back to the base station by the mobile terminal. An estimation of the symbols transmitted by the diversity transmit antennas may be made based on the estimated transmit weight.

In another embodiment of the invention, the closed loop diversity transmission mode may also comprise a WCDMA closed loop 2 (CL2) mode. In instances where the base station is transmitting in this mode, projecting (or correlating) each of the processed diversity signals with respect to a dedicated pilot channel information may generate partial channel estimates. Partial transmitted channel symbols for each of the diversity transmit antennas at the base station may then be estimated based on the generated partial channel estimates. The estimated transmitted symbols from the base station may be generated by combining the estimated partial transmitted channel symbols for each of the diversity transmit antenna at the base station.

In another embodiment of the invention, the diversity transmission mode may comprise a WCDMA/HSDPA open loop (or STTD) mode. In instances where the base station is transmitting in this mode, estimates of transmitted symbols from the base station may be generated by using at least a portion of the common pilot channel information.

The transmitted symbols from the base station may also be estimated based on a feedback weight that is communicated back to the base station. In addition to the closed loop 1 (CL1) mode and the closed loop 2 (CL2) mode, the diversity transmit mode may also comprise open loop (OL) mode. The OL mode may be referred to as space-time transmit diversity (STTD) mode. When CL1 mode is used, a mobile terminal may feed back weights to be used for a single transmitting antenna at the transmitting base station. When CL2 mode is used, the mobile terminal may feed back two weights that are different for each of the two transmitting antennas at the transmitting base station.

Various embodiments of the invention may use two methods for optimizing the transmitted signal with respect to the receiving antenna for the closed loop modes CL1 and CL2. The first method may be referred to as a blind method. In the blind method, a feedback weight may be generated and sent to the transmitting base station by the receiving mobile terminal, and the same feedback weight may be used by the receiving mobile terminal to estimate the transmitted signal. However, there may be instances where there are errors in the feedback weight or weights received by the transmitting station due to, for example, up-link channel disturbances. In these instances, the weight or weights used by the transmitting station may differ from the weight or weights fed back by the mobile terminal. Accordingly, the mobile terminal may not recover the transmitted information accurately since the transmitting station may be using different weight or weights than the receiving mobile terminal.

The second method may allow a more accurate recovery of transmitted information by estimating the weight or weights used from the common and dedicated pilot channels transmitted by the transmitting station. The second method may be referred to as a dedicated pilot method. In this method, the dedicated pilot channel estimates may be used to generate a feedback signal to the transmitting base station.

FIG. 1a is an exemplary illustration of open loop WCDMA/HSDPA communication, in connection with utilization of an embodiment of the invention. Referring to FIG. 1a, there is shown mobile terminals 110 and 112 and a base station (BS) 114. The BS 114 may transmit voice and/or data information to the mobile terminals 110 and/or 112, and receive voice and/or data information from the mobile terminals 110 and/or 112. The BS 114 may transmit in an open loop mode without any weighted feedback from a mobile terminal 110 and/or 112. Accordingly, the mobile terminals 110 and 112 may make estimates of the signals, or symbols, transmitted by the BS 114 based only on the common pilot channels transmitted by the BS 114.

Figure 1B:
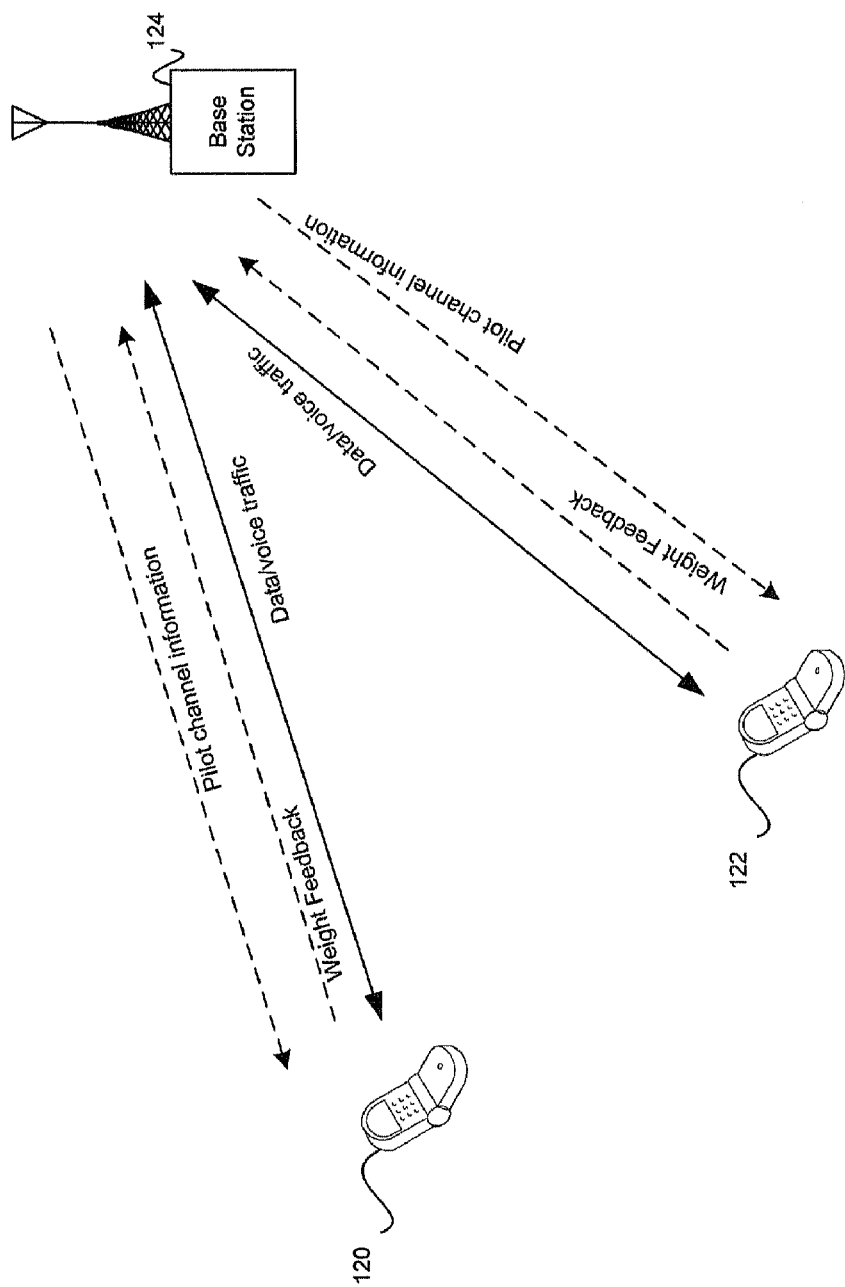
FIG. 1b illustrates an exemplary Layer 1 HARQ control situated in a base station to remove retransmission-related scheduling and storing from the radio network controller, in connection with utilization of an embodiment of the invention.

FIG. 1b is an exemplary illustration of closed loop WCDMA/HSDPA communication, in connection with utilization of an embodiment of the invention. Referring to FIG. 1b, there is shown mobile terminals 120 and 122 and a base station (BS) 124. The BS 124 may transmit voice and/or data information to the mobile terminals 120 and/or 122, and receive voice and/or data information from the mobile terminals 120 and/or 122. The BS 124 may transmit in a closed loop mode with weighted feedback from the mobile terminals 120 and 122. Accordingly, the mobile terminals 120 and 122 may each make estimates of the signals, or symbols, transmitted by the BS 124 based on the common and dedicated pilot channels transmitted by the BS 124 and the weight information initially generated by the mobile terminals 120 and 122, respectively.

The first closed loop method may be referred to as closed loop 1 (CL1) method. When using the CL1 method, a single weight may be generated by each mobile terminal for transmission to the base station. The feedback weight in CL1 method may be one of four different weights. For example, the weight may be +/−0.707 for the X axis and +/−0.707 for the iY axis, where the iY axis may be a Y axis for complex numbers. The four weights that may be generated are illustrated with respect to FIG. 1c.

The second closed loop method may be referred to as closed loop 2 (CL2) method. When using the CL2 method, two weights may be generated by each mobile terminal for transmission to the base station. In an exemplary embodiment of the invention, the feedback weights may allow two different power combinations for two signals $s_1$ and $s_2$ transmitted by the base station 124, and eight different phase adjustments for one of the two signals, for example, $s_2$, transmitted by the base station 124. Accordingly, a feedback weight may be one of 16 different weights. The 16 weights that may be generated are illustrated with respect to FIG. 1d.

Figure 1C:
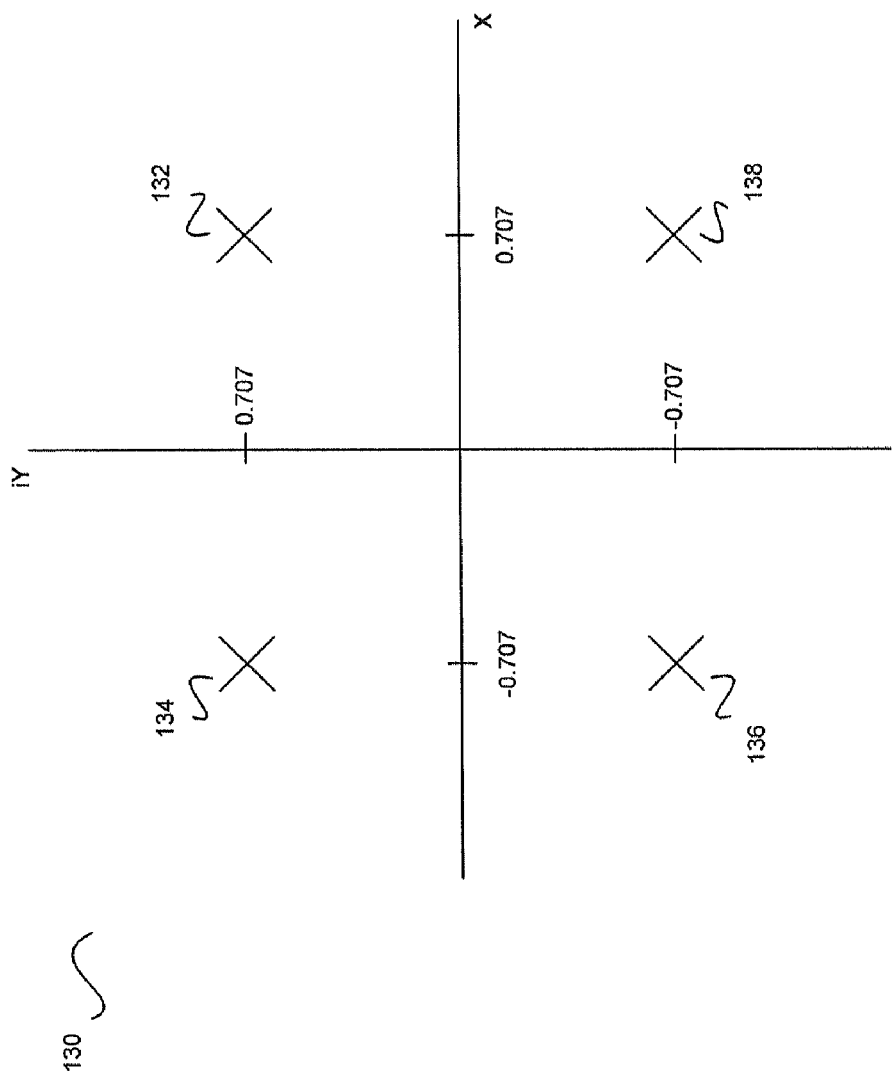
FIG. 1c illustrates closed loop 1 feedback weights, in connection with utilization of an embodiment of the invention.

FIG. 1c illustrates closed loop 1 feedback weights, in connection with utilization of an embodiment of the invention. Referring to FIG. 1c, there is shown a graph 130 of four weight values 132, . . . , 138 generated by, for example, the mobile terminal 120 and/or 122. The weight from each mobile terminal 120 and 122 is fed back to, for example, the base station 124 in accordance with WCDMA/HSDPA standards. The first weight value 132 may indicate a phase of $\pi/4$. The second weight value 134 may indicate a phase of $3\pi/4$. The third weight value 136 may indicate a phase of $5\pi/4$. The fourth weight value 138 may indicate a phase of $7\pi/4$. All four weight values 132, . . . , 138 may have a normalized power of one. The weight fed back to the base station 124 may be used to modulate one of the two signals transmitted by the base station 124. For example, a signal $s_2$ transmitted by the base station 124 may be the signal modulated by the weight from the mobile terminal 120 and/or 122, while a signal $s_1$ transmitted by the base station 124 may not be modulated by any weight.

Figure 1D:
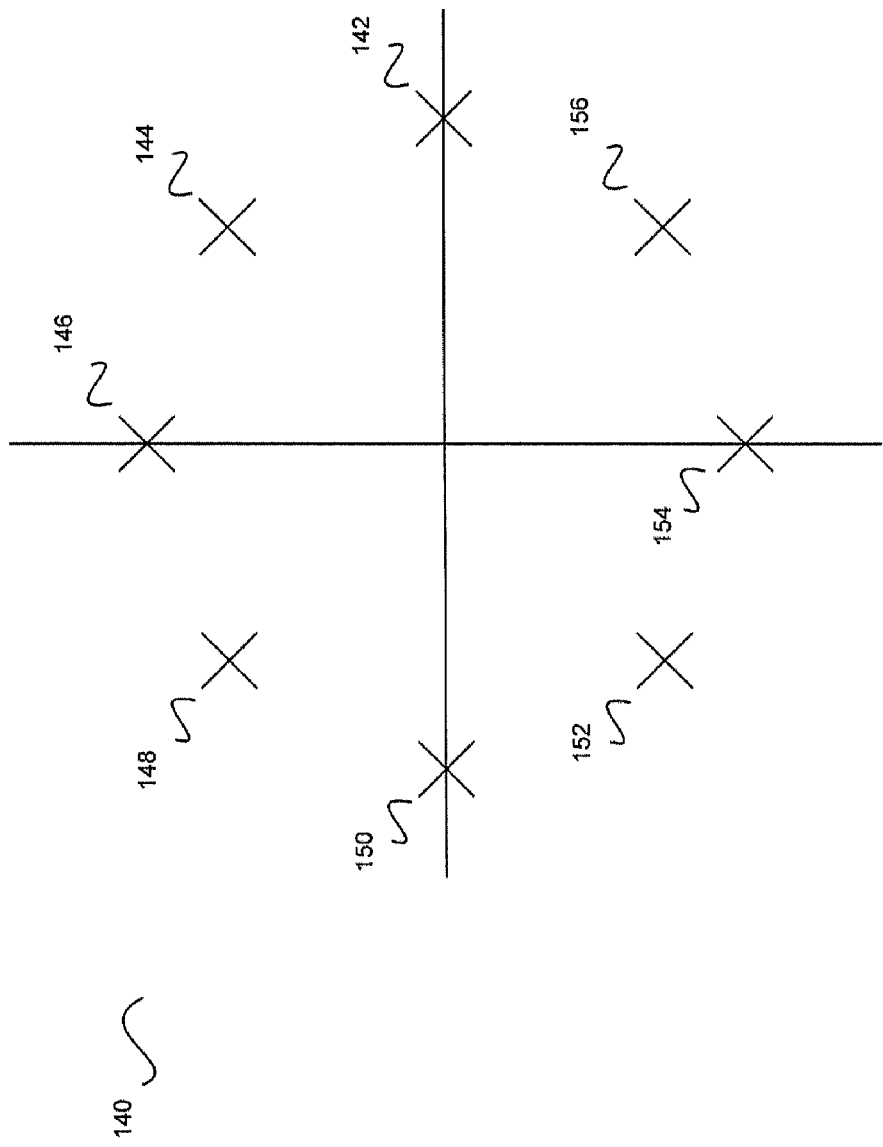
FIG. 1d illustrates closed loop 2 feedback phases, in connection with utilization of an embodiment of the invention.

FIG. 1d illustrates closed loop 2 feedback phases, in connection with utilization of an embodiment of the invention. Referring to FIG. 1d, there is shown a graph 140 of eight phase values 142, . . . , 156 generated by, for example, the mobile terminal 120 and/or 122. The phase value is a part of a weight generated by a mobile terminal. The first weight value 142 may indicate a phase of zero. The second weight value 144 may indicate a phase of $\pi/4$. The third weight value 146 may indicate a phase of $\pi/2$. The fourth weight value 148 may indicate a phase of $3\pi/4$. The fifth weight value 150 may indicate a phase of $\pi$. The sixth weight value 150 may indicate a phase of $5\pi/4$. The seventh weight value 152 may indicate a phase of $3\pi/2$. The eighth weight value 154 may indicate a phase of $7\pi/4$.

A mobile terminal may also generate, for example, one of two power combinations for the two signals transmitted by the base station. In accordance with an exemplary embodiment of the invention, one power combination may serve as an indication to the base station 124 to allocate power in the ratio of 80% and 20% for the transmitted signals $s_1$ and $s_2$, respectively. In accordance with an exemplary embodiment of the invention, the other power combination may serve as and indication to the base station 124 to allocate power in the ratio of 20% and 80% for the transmitted signals $s_1$ and $s_2$, respectively. The power combinations may also be a part of the weight generated by a mobile terminal. The weight may be fed back to a base station in accordance with WCDMA/HSDPA standards by a mobile terminal. Accordingly, the weight fed back to a base station may be one of 16 different weights.

The base station 124 may use the phase value to modulate the phase of one of the two signals transmitted, for example, the signal $s_2$, by the base station 124. The base station 124 may also use the power ratio to modulate the power of the two signals transmitted, for example, the signals $s_1$ and $s_2$.

Figure 2:
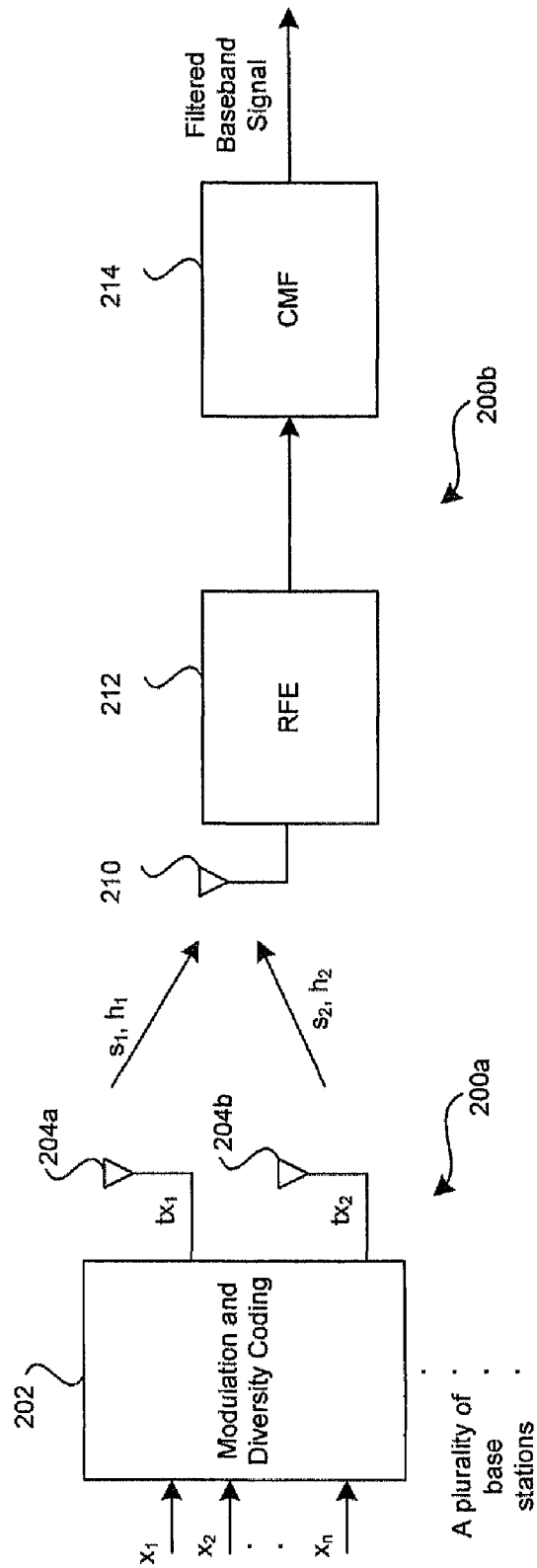
FIG. 2 is a block diagram illustrating exemplary receiver front end and chip matched filter, in accordance with an embodiment of the invention.

FIG. 2 is a block diagram illustrating exemplary receiver front end and chip matched filter, in accordance with an embodiment of the invention. Referring to FIG. 2, there is shown a transmitter section 200a, and a receiver section 200b. The transmitter section 200a may comprise a modulation and coding block 202 and a plurality of transmit antennas 204a and 204b. Data inputs $x_1, x_2, \ldots, x_n$, which may be referred to as symbols, may be inputs to the modulation and coding block 202. Signals $tx_1$ and $tx_2$ may be RF signals generated by the modulation and coding block 202 and communicated to the transmit antennas 204a and 204b, respectively. The receiver section 200b may comprise a receive antenna 210, a RFE block 212, and a channel matched filter (CMF) block 214.

On the transmit side 200a, the modulation and coding block 202 may be adapted to generate RF signals $tx_1$, and $tx_2$ from the data inputs $x_1, x_2, \ldots, x_n$, which may be referred to as symbols. The RF signals $tx_1$ and $tx_2$ may be transmitted via transmit antennas 204a and 204b, respectively. The RF signals transmitted via the transmit antennas 204a and 204b, for example, the RF signals $s_1$ and $s_2$, respectively, may be represented as propagating via channels having time varying impulse responses $h_1$ and $h_2$, respectively. The RF signals $s_1$ and $s_2$ may be the same signal or they may be different signals. For example, the RF signals $s_1$ and $s_2$ may comprise the same data in the CL1 and CL2 modes or different data in the space-time transmit diversity (STTD) mode.

On the receive side 200b, the receive antenna 210 may comprise suitable logic, circuitry and/or code that may be adapted to receive RF signals, for example, the RF signals $s_1$ and $s_2$. The RFE block 212 may comprise suitable logic, circuitry and/or code that may be adapted to receive RF signals as input and convert these RF signals to digital baseband signals. After generating an analog baseband signal, the RFE block 212 may digitally sample the analog baseband signal at a pre-determined rate, and the resulting digital baseband signal may be an output of the RFE block 212. The CMF block 214 may comprise suitable logic, circuitry and/or code that may be adapted to digitally filter the WCDMA/HSDPA baseband bandwidth, and may be a pair of digital filters of the type Square Root Raised Cosine, as required by the WCDMA/HSDPA Standard body.

In operation, the modulation and coding block 202 may transmit RF signals via the transmit antennas 204a and 204b, and the receive antenna 210 may receive the RF signals, and may communicate the received RF signals to the RFE block 212. The RFE block 212 may process the received RF signals by filtering, amplifying, and/or down-converting the received RF signals to baseband signals. The baseband signal may be digitally sampled by an analog-to-digital converter at a determined sampling rate. The digitally sampled signal may be the output of the RFE block 212, and this signal may be communicated to the CMF block 214 where it may be digitally filtered. The filtered signals may be output by the CMF block 214 and communicated to a processor, for example, a cluster path processor (CPP) that may process various multipath signals of RF signals transmitted by an antenna, for example, the transmit antenna 204a or 204b.

Figure 3:
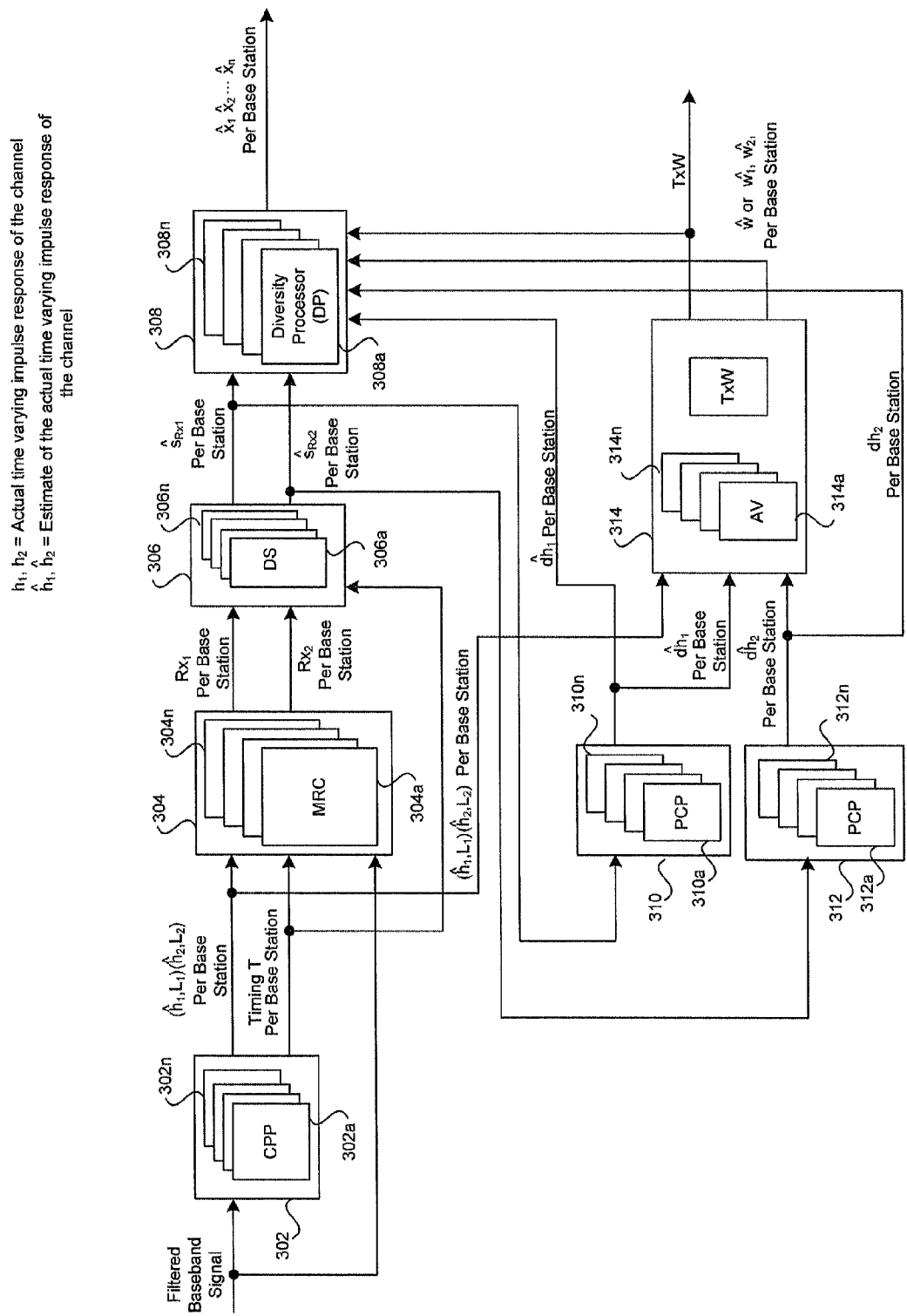
FIG. 3 is a block diagram illustrating symbol demodulation of diversity encoded transmission for WCDMA/HSDPA, in accordance with an embodiment of the invention.

FIG. 3 is a block diagram illustrating symbol demodulation of diversity encoded transmission for WCDMA/HSDPA, in accordance with an embodiment of the invention. Referring to FIG. 3, there is shown a cluster path processor (CPP) block 302, a maximum ratio combiner (MRC) block 304, a despreader (DS) block 306, a diversity processor (DP) block 308, dedicated pilot channel processor (PCP) blocks 310 and 312, and an antenna verifier (AV) block 314. The actual time varying impulse responses of the channels from the transmit antennas, for example, the transmit antennas 204a and 204b (FIG. 2), to the receive antenna, for example, the receive antenna 210 (FIG. 2), is represented by $h_1$ and $h_2$, respectively, per base station. The estimates of the actual time varying impulse responses of the channels $h_1$ and $h_2$ may be represented by $\hat{h}_1$ and $\hat{h}_2$, respectively, per base station. Information from a WCDMA/HSDPA common pilot channel may be utilized to generate the estimated time varying impulse responses $\hat{h}_1$ and $\hat{h}_2$.

The CPP block 302 may comprise a plurality of cluster path processors that may be adapted to receive and process an output of the CMF block 214 (FIG. 2). The CPPs 302a, . . . , 302n within the CPP block 302 may be partitioned into pairs of CPPs, wherein each pair of CPPs may be adapted to track time-wise clusters of multipath signals and to estimate the complex phase and amplitude of the multipath signals in the signal clusters. The signal cluster may comprise an aggregate of received signals paths with maximum time difference that may be no more than $16/(3.84 \times 10^6)$ seconds. U.S. application Ser. No. 11/173,854 filed on Jun. 30, 2005 provides a description of signal clusters and is hereby incorporated herein by reference in its entirety.

In one aspect of the invention, two CPPs may be utilized since the WCDMA/HSDPA standard facilitates a diversity transmitting mode in which the transmitted signal is transmitted over two antennas from each base station. The diversity transmit modes may comprise closed loop 1 (CL1) mode, closed loop 2 (CL2) mode, and open loop mode (OL) that may also be referred to as space-time transmit diversity (STTD) mode. The CPP block 302 may be adapted to determine channel estimates and lock indicators $(\hat{h}_1, L_1)$ and $(\hat{h}_2, L_2)$ per base station of the time varying impulse responses of the channels, for example, $h_1$ and $h_2$, and recover information transmitted over the channels on a per base station basis. The lock indicators $L_1$ and $L_2$ may provide an indication of which components in the corresponding estimates may comprise valid component values. An embodiment of the invention may use a strength of received signal to assert the lock indicators. However, in instances where there is only one transmitting antenna per base station, then only one CPP may be assigned per base station.

The maximum ratio combining (MRC) block 304 may comprise a plurality of MRCs, namely 304a, . . . , 304n. Cluster timing and estimates of the time varying impulse response of the channel may be provided to the MRC block 304 on a per base station basis. The MRC block 304 may be adapted to provide a simplified and effective combining scheme or mechanism for implementing a RAKE receiver to combat noise, fading, and to a certain degree, co-channel interference. In accordance with an embodiment of the invention, each of the MRCs 304a, . . . , 304n may comprise suitable logic, circuitry and/or code that may be adapted to combine multipath signals coherently and noise incoherently utilizing the maximum ratio combining algorithm. Each of the MRCs 304a, . . . , 304n may output at least one processed diversity signal. Accordingly, each of the MRCs 304a, . . . , 304n may output two processed diversity signals for a base station. Each of the MRCs 304a, . . . , 304n may be adapted to utilize the same proportionality constant for the channels. Other optimal combining algorithms such as, for example, minimum mean square error (MMSE) algorithm, may also be utilized. U.S. application Ser. No. 11/173,870 filed on Jun. 30, 2005 provides a description of an MRC and is hereby incorporated herein by reference in its entirety.

The DS block 306 may comprise a plurality of DSs, namely 306a, . . . , 306n. Each of the DSs 306a, . . . , 306n may comprise suitable logic, circuitry, and/or code that may be adapted to despread received signals that may have been previously spread through the application of orthogonal spreading codes in the transmitter. Prior to transmission of an information signal, known as a "symbol", the transmitter may have applied an orthogonal spreading code that produced a signal comprising a plurality of chips. The DS block 306 may be adapted to generate local codes, for example Gold codes or orthogonal variable spreading factor (OVSF) codes, that may be applied to received signals through a method that may comprise multiplication and accumulation operations. Processing gain may be realized after completion of integration over a pre-determined number of chips in which the symbol is modulated.

Following despreading at the receiver, the original symbol may be extracted. WCDMA/HSDPA may support the simultaneous transmission of a plurality of spread spectrum signals in a single RF signal by utilizing spreading codes among the spread spectrum signals which are orthogonal to reduce multiple access interference (MAI). The receiver may extract an individual symbol from the transmitted plurality of spread spectrum signals by applying a despreading code, which may be equivalent to the code that was utilized for generating the spread spectrum signal. Similarly to the CPP block 302, and the MRC block 304, the DS block 306 may be assigned on a per base station basis, with the MRC block 304 communicating with the DS block 306 that may be assigned to the same base stations.

The DP block 308 may comprise a plurality of DPs, namely 308a, . . . , 308n. In accordance with an embodiment of the invention, each of the DPs 308a, . . . , 308n may comprise suitable logic, circuit and/or code that may be adapted to combine signals transmitted from multiple antennas in diversity modes. According to the 3GPP technical specification 25.211, version 6, the diversity modes may comprise open loop (OL or STTD), closed loop 1 (CL1), and closed loop 2 (CL2). Closed loop techniques typically work better in slower changing propagation environments since it is easier to keep up with variations in the channel in these cases. In accordance with an embodiment of the invention, the diversity mode signals may be processed in a single hardware block requiring signal inputs from MRC block 304.

For the dedicated pilot method, the DP block 308 may receive dedicated pilot channel estimates from the PCP blocks 310 and 312. Additionally, the DP block 308 may receive a single weight per base station from the AV block 314 for the CL1 antenna verification method, and two weights per base station from the AV block 314 for the CL2 antenna verification method. For the blind method, the DP block 308 may receive the same feedback channel weight T×W as sent to the base station. The outputs of the DP block 308 may be generated on a per base station basis.

The PCP blocks 310 and 312 may comprise a plurality of PCPs, namely 310a, . . . , 310n, and 312a, . . . , 312n, respectively. In accordance with an embodiment of the invention, each of the PCPs 310a, . . . , 310n, and 312a, . . . , 312n may comprise suitable logic, circuit and/or code that may be adapted to provide coherent detection of and a phase reference for a transmit antenna by monitoring the dedicated pilot channels of the respective antennas. For example, a PCP in the PCP block 310 may provide coherent detection of and a phase reference for the transmit antenna 204a (FIG. 2), and a PCP in the PCP block 312 may provide coherent detection of and a phase reference for the transmit antenna 204b (FIG. 2). The outputs of the PCP blocks 310 and 312 may be per base station, and may be communicated to the AV block 314 and/or the DP block 308.

The dedicated control channel in WCDMA/HSDPA contains power control bits and rate information. The synchronization channel in WCDMA/HSDPA is used by the mobile stations to acquire initial time synchronization. One or more paging channels are used in WCDMA/HSDPA for paging the mobiles. In WCDMA/HSDPA, the common pilot channel provides a reference signal for coherent detection, cell acquisition, and handoffs. In addition to the common pilot channel, a dedicated pilot channel may be received by each mobile when operating on a dedicated channel. The dedicated pilot channel may be a time multiplexed channel providing information used for diversity operations in a WCDMA/HSDPA network.

The AV block 314 may comprise a plurality of AVs, namely 314a, . . . , 314n, and a feedback channel weight generator (T×W) block 314q. In accordance with an embodiment of the invention, each of the AVs 314a, . . . , 314n may comprise suitable logic, circuit and/or code that may be adapted to process dedicated pilot channel information from the PCP blocks 310 and 312 and common pilot channel estimate from the CPP block 302, and output an estimated channel weight $\hat{w}$ that may be used by the DP block 308. In instances where the blind method is used, the DP block 308 may utilize the feedback channel weight T×W sent to the base station. The feedback channel weight T×W may be calculated by the T×W block 314q using the channel estimates $\hat{h}_1$ and $\hat{h}_2$ for the two transmitting antennas in the CL1 and CL2 diversity modes.

The AVs 314a, . . . , 314n may generate the estimated channel weight $\hat{w}$ that may be communicated to the DP block 308 for the antenna verification method. For the CL1 mode antenna verification method, the estimated channel weight $\hat{w}$ may comprise a single weight. For the CL2 mode antenna verification method, the estimated channel weight Ws may comprise two weights. The diversity mode CL1 typically has better performance when the mobile terminal is moving at relatively higher speeds with respect to the base station. For example, the diversity mode CL 1 may be more applicable where the Doppler frequency shift due to the moving user equipment (UE) is greater than or equal to 60 Hz. The diversity mode CL2 may be more applicable when the Doppler frequency shift is less than 60 Hz.

In operation, a filtered baseband signal may be processed by pairs of CPPs in CPP block 302 so as to produce channel estimates $\hat{h}_1$ and $\hat{h}_2$, along with timing information T. The channel estimates $\hat{h}_1$ and $\hat{h}_2$ and the timing information T may be generated on a per base station basis. The channel estimates $\hat{h}_1$, $\hat{h}_2$ and the timing information T per base station may then be communicated to the MRC block 304, and the channel estimates $\hat{h}_1$, $\hat{h}_2$ may be communicated to the AV block 314, for processing. The timing information T per base station may also be communicated to the DS block 306. The MRC block 304 may be adapted to utilize the channel estimates $\hat{h}_1$, $\hat{h}_2$ and timing information T per base station, as well as the filtered baseband signal, to produce an estimated output signal for signals transmitted by each transmit antenna at a base station. The estimated output signals may be communicated to the DS block 306.

The DS block 306 may be adapted to despread and generate output estimates on a per base station basis. The DS block 306 may utilize inputs communicated from the MRC block 304 and from the CPP block 302 to generate the output estimates. The output estimates from the DS block 306 may be communicated to the DP block 308, and to the PCP blocks 310 and 312. The DP block 308 may be adapted to provide diversity processing and generate output symbol estimates on a per base station basis. The DP block 308 may utilize inputs communicated from the DS block 306, from the PCP blocks 310 and 312, and from the AV block 314 to generate output symbol estimates. The output symbol estimates may be communicated to other processors, for example, a convolutional decoder or a turbo decoder where they may be further processed to extract voice or data information, respectively.

The PCP blocks 310 and 312 may process the estimated output from the DS block 306 to generate information specific to a transmitting antenna, for example, antennas 204a and 204b (FIG. 2), respectively, and this information may be communicated to the AV block 314 and/or to the DP block 308. The outputs of the PCP blocks 310 and 312 may be generated on a per base station basis. The AV block 314 may process the relevant antenna information in order to generate the estimated channel weight $\hat{w}$ when the base station transmits utilizing the diversity modes CL1 and CL2. In addition, the feedback channel weight T×W may be calculated using the common pilot channel estimates for the two transmitting diversity antennas. The calculated feedback channel weight T×W may be transmitted to the base station, and may also be communicated to the DP block 308 in the case of the blind CL1 and CL2 methods.

Although two CPPs may be utilized per base station due to the present WCDMA/HSDPA standard, this should not be considered a limitation on the number of CPPs that may be assigned to a base station. Other implementations of the invention may assign a plurality of CPPs per base station as needed because of the number of transmitting antennas at the base station, or for some other reasons. Additionally, the cluster period of $16/(3.84\times10^6)$ seconds may be design and/or implementation dependent. Accordingly, the invention need not be limited to this cluster period.

Figure 4:
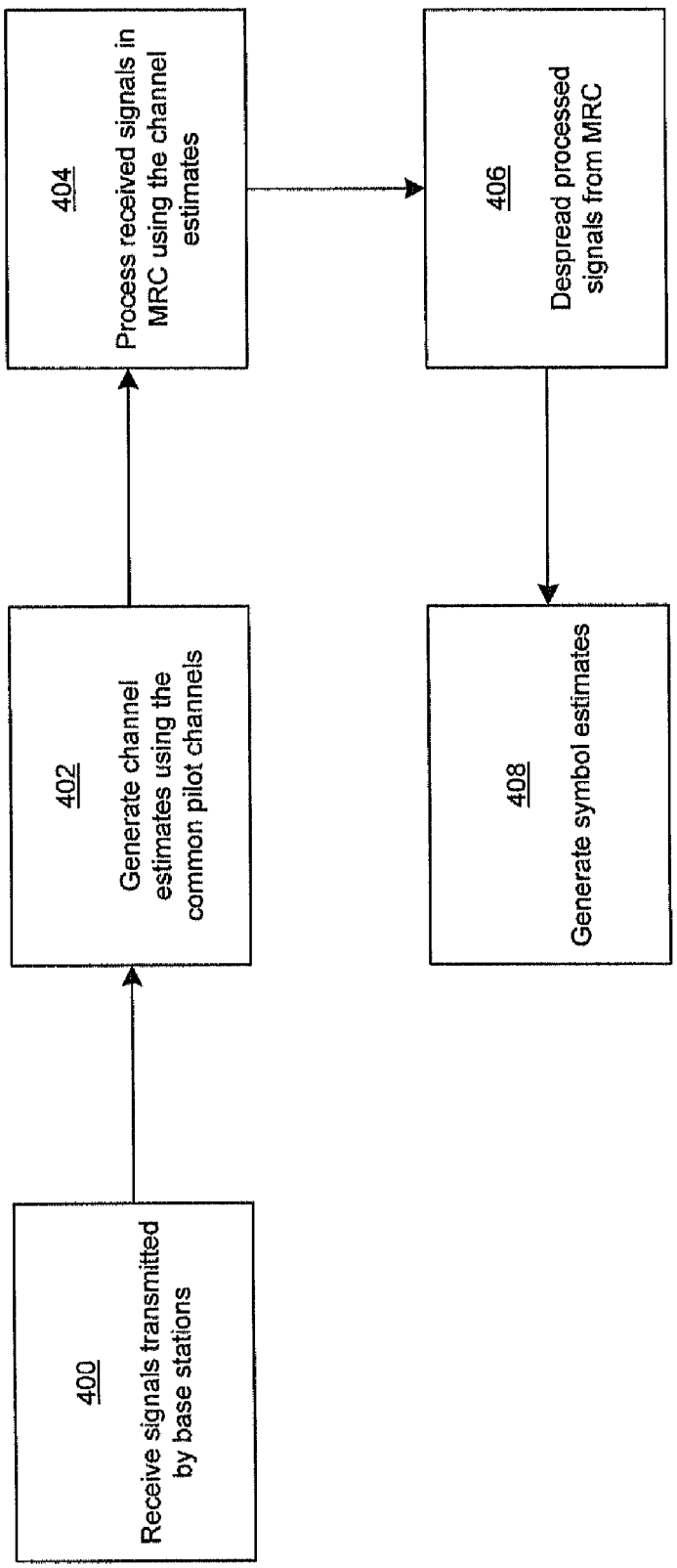
FIG. 4 is an exemplary flow diagram illustrating diversity processing using an STTD mode, in accordance with an embodiment of the invention.

FIG. 4 is an exemplary flow diagram illustrating diversity processing using a STTD mode, in accordance with an embodiment of the invention. The STTD mode is an open loop mode, and, therefore, there is no feedback weight sent from a mobile terminal to a base station. A space-time coding algorithm may modulate the signals comprising symbols that are transmitted by the transmitting antennas, and each antenna may transmit different data. Accordingly, the processing of the received signals by the receiving mobile terminal may be simplified since feedback weights need not be generated and only a space-time decoding algorithm may be required.

Referring to FIG. 4, the steps 400 to 408 may be utilized to process diversity signals. In step 400, the open loop mode, or STTD mode, signals $r_1$ and $r_2$ may be received at two consecutive time intervals by, for example, the receive antenna 210. This may be represented by the following equation. A single fading path may be assumed to simplify notation.

$$\vec{r} = \begin{bmatrix} r_1 \\ r_2 \end{bmatrix} = \begin{bmatrix} s_1 & -s_2^* \\ s_2 & s_1^* \end{bmatrix} \begin{bmatrix} h_1 \\ h_2 \end{bmatrix} \quad (1)$$

The variables $s_1$ and $s_2$ represent signals (symbols) transmitted by the transmitting base station, and $h_1$ and $h_2$ represent the actual propagation channels.

In step 402, the CPP block 302 may generate the channel estimates $\hat{h}_1$ and $\hat{h}_2$ based on the common pilot channels transmitted by each base station, for example, the base station 202. The variables $\hat{h}_1$ and $\hat{h}_2$ may represent estimates of the channels for $s_1$ and $s_2$, respectively. An asterisk (*) after a variable name may indicate a complex conjugate of that variable. For example, $s_2^*$ may be a complex conjugate of $s_2$.

In step 404, the MRC block 304 may process the filtered, digitized baseband signal from the CMF 214 using the channel estimates $\hat{h}_1$ and $\hat{h}_2$ from the CPP block 302. The inputs to the MRC block 304 may be multipath signals from the two transmit antennas for each base station, for example. Each MRC in the MRC block 304 may combine the multipath signals from a base station to generate at least one processed diversity signal. The received signal in the MRC block 304 may be multiplied by the complex conjugate channel estimates $\hat{h}_1^*$ and $\hat{h}_2^*$, respectively:

$$\hat{h}_1^* r_1 = \hat{h}_1^*(h_1 s_1 - h_2 s_2^*) = |h_1|^2 s_1 - \hat{h}_1^* h_2 s_2^* \quad (2)$$

$$\hat{h}_1^* r_2 = \hat{h}_1^*(h_1 s_2 + h_2 s_1^*) = |h_1|^2 s_2 + \hat{h}_1 h_2 s_1^* \quad (3)$$

$$\hat{h}_2^* r_1 = \hat{h}_2^*(h_1 s_1 - h_2 s_2^*) = -|h_2|^2 s_2^* + h_1 \hat{h}_2^* s_1 \quad (4)$$

$$\hat{h}_2^* r_2 = \hat{h}_2^*(h_1 s_2 + h_2 s_1^*) = |h_2|^2 s_1^* + h_1 \hat{h}_2^* s_2 \quad (5)$$

In step 406, the two processed diversity signals from the MRC block 304 for each base station may be despread by the DS block 306. The output of the DS block 306 may be communicated to the DP block 308. In step 408, the DP block 308 may make an estimate $\hat{s}$ of the transmitted signals (symbols), which may be derived from equations 2-5 and may be written as:

$$\hat{s} = \begin{bmatrix} \hat{s}_1 \\ \hat{s}_2 \end{bmatrix} = \begin{bmatrix} \hat{h}_1^* r_1 + \hat{h}_2 r_2^* \\ \hat{h}_1^* r_2 - \hat{h}_2 r_1^* \end{bmatrix} \quad (6)$$

where $\hat{s}_1$ and $\hat{s}_2$ may be estimates of the transmitted signals $s_1$ and $s_2$, respectively. The resulting signal estimates may be:

$$\hat{s} = \begin{bmatrix} \hat{s}_1 \\ \hat{s}_2 \end{bmatrix} \quad (7)$$

$$= \begin{bmatrix} |h_1|^2 s_1 - \hat{h}_1^* h_2 s_2^* + |h_2|^2 s_1 + h_1^* \hat{h}_2 s_2^* \\ |h_1|^2 s_2 + \hat{h}_1^* h_2 s_1^* + |h_2|^2 s_2 - h_1^* \hat{h}_2 s_1^* \end{bmatrix}$$

$$= \begin{bmatrix} (|h_1^2| + |h_2|^2) s_1 \\ (|h_1|^2 + |h_2|^2) s_2 \end{bmatrix}$$

Figure 5A:
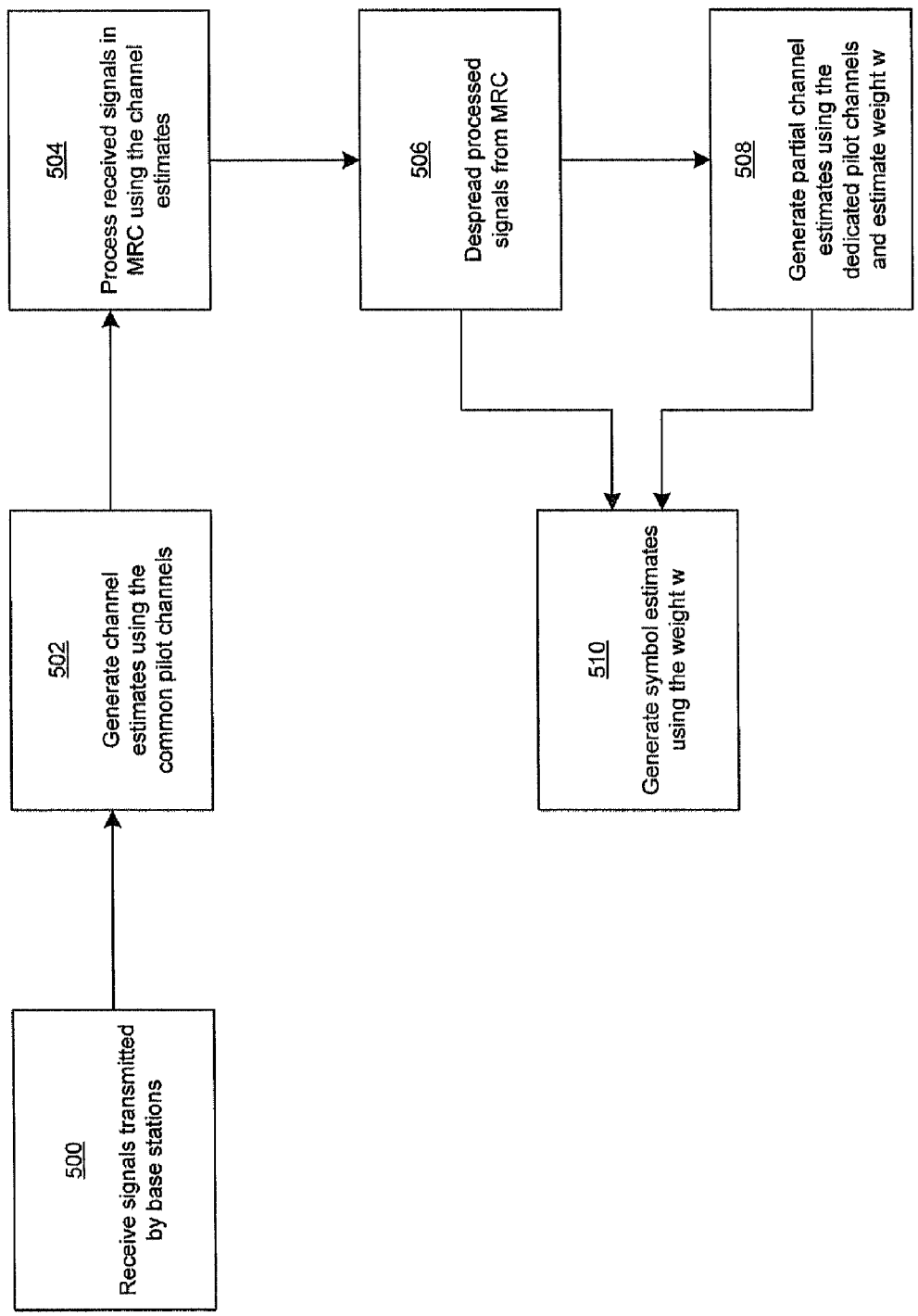
FIG. 5a is an exemplary flow diagram illustrating diversity processing using a closed loop 1 dedicated pilot method, in accordance with an embodiment of the invention.

FIG. 5a is an exemplary flow diagram illustrating diversity processing using a closed loop 1 dedicated pilot method, in accordance with an embodiment of the invention. The closed loop 1 dedicated pilot method may utilize a dedicated pilot channel for each transmit antenna and an estimate of a weight used by one of the two transmit antennas. Referring to FIG. 5a, the steps 500 to 510 may be utilized to process diversity signals. Diversity signals may be signals that are transmitted by more than one antenna, for example, the signals $s_1$ and $s_2$ transmitted by the diversity antennas 204a and 204b. The diversity signals may relate to the same information, but may be transmitted in a diversity configuration in order to attain stronger received signal. Since the diversity signals relate to the same information, part of a receive system that receives the transmitted diversity signals, for example, the circuitry illustrated in FIG. 3, may combine the diversity signals in order to recover the transmitted information.

In step 500, the antenna 210 may receive the signals $s_1$ and $s_2$ transmitted by the diversity antennas 204a and 204b. The received signal r may be described by the following equation:

$$r = (h_1 + w h_2) s \quad (8)$$

where $h_1$ and $h_2$ may be propagation channels. w may be the weight applied to the signals transmitted by the antenna 204b, and s may be the signals transmitted by the transmit antennas 204a and 204b. The received signal r may be processed by the RFE 212 and the CMF 214. The CMF 214 may communicate a filtered, digitized baseband signal to the CPP block 302 and the MRC block 304.

In step 502, the CPP block 302 may generate the channel estimates $\hat{h}_1$ and $\hat{h}_2$ based on the common pilot channels transmitted by each base station, for example, the base station 202. In step 504, the MRC block 304 may process the filtered, digitized baseband signal from the CMF 214 using the channel estimates $\hat{h}_1$ and $\hat{h}_2$ from the CPP block 302. The inputs to the MRC block 304 may be multipath signals from the two transmit antennas for each base station, for example. Each MRC in the MRC block 304 may combine the multipath signals from a base station to generate at least one processed diversity signal. The received signal in the MRC block 304 may be multiplied by the complex conjugate channel estimates $\hat{h}_1^*$ and $\hat{h}_2^*$, respectively:

$$\hat{h}_1^* r = \hat{h}_1^*(h_1 + w h_2) s = (|h_1|^2 + w \hat{h}_1^* h_2) s \quad (9)$$

$$\hat{h}_2^* r = \hat{h}_2^*(h_1 + w h_2) s = (w|h_2|^2 + h_1 \hat{h}_2) s \quad (10)$$

The received dedicated pilot symbols $x_1$ and $x_2$, which may be orthogonal to each other, may be substituted for the received signal s in equations 9 and 10. The dedicated pilot symbols $x_1$ and $x_2$, may have been transmitted, for example, by the transmit antennas 204a and 204b, respectively. The received signals at the output of the MRC block 304 may be written as:

$$\hat{h}_1^* r_{dp} = \hat{h}_1^*(h_1 x_1 + w h_2 x_2) = |h_1|^2 x_1 + w \hat{h}_1 h_2 x_2 \quad (11)$$

$$\hat{h}_2^* r_{dp} = \hat{h}_2^*(h_1 x_1 + w h_2 x_2) = w|h_2|^2 x_2 + h_1 \hat{h}_2^* x_1 \quad (12)$$

In step 506, the two processed diversity signals from the MRC block 304 for each base station may be despread by the DS block 306. The output of the DS block 306 may be communicated to the DP block 308 and the PCP blocks 310 and 312. In step 508, the PCP blocks 310 and 312 may determine partial channel estimates by applying the orthogonality principle to the equations 11 and 12. Projections (or correlations) of the equations 11 and 12 with respect to variables $x_1$ and $x_2$ may result in the partial channel estimates:

$\hat{h}_1^* r_{dp}$ projected (or correlated) with $x_1$ may result in
$(|h_1|^2)_{dp}$, (13)

$\hat{h}_1^* r_{dp}$ projected (or correlated) with $x_2$ may result in
$(w\hat{h}_1^* h_2)_{dp}$, (14)

$\hat{h}_2^* r_{dp}$ projected (or correlated) with $x_1$ may result in
$(w|h_2|^2)_{dp}$, and (15)

$\hat{h}_2^* r_{dp}$ projected (or correlated) with $x_2$ may result in
$(h_1 \hat{h}_2^*)_{dp}$. (16)

The weight w may then be derived from the partial channel estimate 15. An estimated transmit weight $\hat{w}$ of the CU transmit antenna weight w may be made by selecting one of the four weight values 132, 134, 136, and 138 that may be the closest to the derived weight w.

In step 510, the DP block 308 may make data symbol estimates $\hat{s}$ by using the estimated transmit weight $\hat{w}$:

$$\begin{aligned}
\hat{s} &= \hat{h}_1^* r + \hat{w}^* \hat{h}_2^* r \\
&= \hat{h}_1^*(h_1 + wh_2)s + \hat{w}^* \hat{h}_2^* r(h_1 + wh_2)s \\
&= (|h_1|^2 + w\hat{h}_1^* h_2 + \hat{w}^* \hat{h}_1^* \hat{h}_2^* + |w|^2|h_2|^2)s \\
&= (|h_1|^2 + 2\mathrm{Re}(w\hat{h}_1^* h_2) + |w|^2|h_2|^2)s
\end{aligned}$$ (17)

It may be noted that the result of equation 17 may be equivalent to performing standard channel plus transmit weight de-rotation:

$$\begin{aligned}
\hat{s} &= (\hat{h}_1 + \hat{w}\hat{h}_2)^*(h_1 + wh_2)s \\
&= (|h_1|^2 + w\hat{h}_1^* h_2 + \hat{w}^* h_1 \hat{h}_2^* + |w|^2|h_2|^2)s \\
&= (|h_1|^2 + 2\mathrm{Re}(w\hat{h}_1^* h_2) + |w|^2|h_2|^2)s
\end{aligned}$$ (18)

Figure 5B:
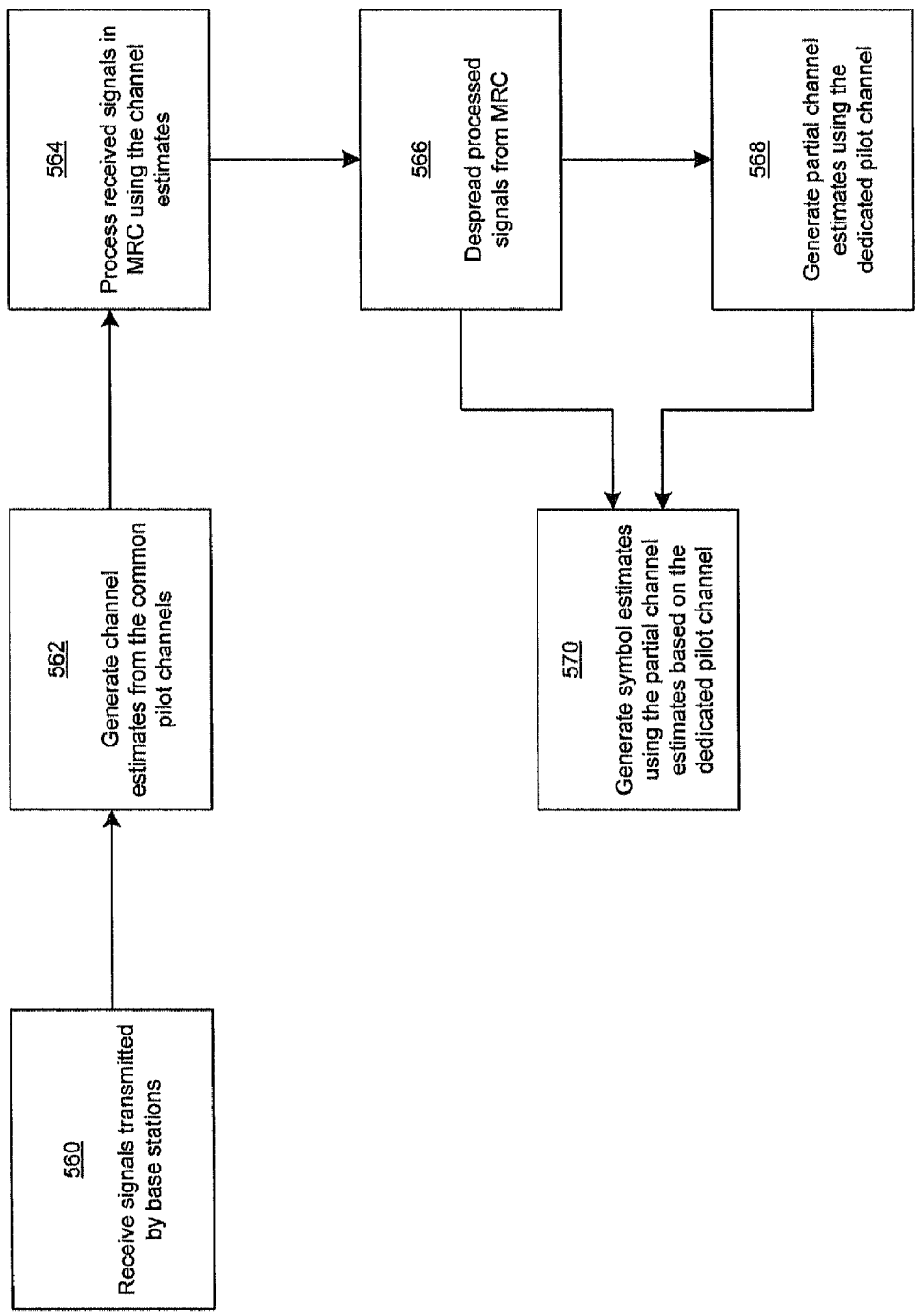
FIG. 5b is an exemplary flow diagram illustrating diversity processing using a closed loop 2 dedicated pilot method, in accordance with an embodiment of the invention.

FIG. 5b is an exemplary flow diagram illustrating diversity processing using a closed loop 2 dedicated pilot method, in accordance with an embodiment of the invention. The closed loop 2 dedicated pilot method may utilize a dedicated pilot channel transmitted by the two transmit antennas. Referring to FIG. 5b, the steps 560 to 570 may be utilized to process diversity signals. Diversity signals may be signals that are transmitted by more than one antenna, for example, the signals $s_1$ and $s_2$ transmitted by the diversity antennas 204a and 204b. The diversity signals may relate to the same information, but may be transmitted in a diversity configuration in order to attain a stronger received signal. Since the diversity signals relate to the same information, part of a receive system that receives the transmitted diversity signals, for example, the circuitry illustrated in FIG. 3, may combine the diversity signals in order to recover the transmitted information.

In step 560, the antenna 210 may receive the signals $s_1$ and $s_2$ transmitted by the diversity antennas 204a and 204b. The received signal r may be described by the following equation:

$r = (w_1 h_1 + w_2 h_2)s$ (19)

where $h_1$ and $h_2$ may be actual propagation channels. The values $w_1$ and $w_2$ may represent the transmit weights applied to the signals transmitted by the antennas 204a and 204b, respectively, and s may be the signals transmitted by the transmit antennas 204a and 204b. The received signal r may be processed by the RFE 212 and the CMF 214. The CMF 214 may communicate a filtered, digitized baseband signal to the CPP block 302 and the MRC block 304.

In step 562, the CPP block 302 may generate the channel estimates $\hat{h}_1$ and $\hat{h}_2$ based on the common pilot channels transmitted by each base station, for example, the base station 202. In step 564, the MRC block 304 may process the filtered, digitized baseband signal from the CMF 214 using the channel estimates $\hat{h}_1$ and $\hat{h}_2$ from the CPP block 302. The inputs to the MRC block 304 may be multipath signals from the two transmit antennas for each base station, for example. Each MRC in the MRC block 304 may combine the multipath signals from a base station to generate at least one processed diversity signal. The received signal may be multiplied by the complex conjugate channel estimates and $\hat{h}_1^*$ and $\hat{h}_2^*$, respectively:

$\hat{h}_1^* r = \hat{h}_1^*(w_1 h_1 + w_2 h_2)s = (w_1|h_1|^2 + w_2 \hat{h}_1^* h_2)s$ (20)

$\hat{h}_2^* r = \hat{h}_2^*(w_1 h_1 + w_2 h_2)s = (w_2|h_2|^2 + w_1 h_1 \hat{h}_2^*)s$ (21)

The received dedicated pilot symbols x may be substituted for the received signal s in equations 20 and 21. The transmit antennas 204a and 204b may each transmit the same symbols x via the dedicated pilot channel, for example. The received signals at the output of the MRC block 304 may be written as:

$\hat{h}_1^* r_{dp} = \hat{h}_1^*(w_1 h_1 + w_2 h_2)x = (w_1|h_1|^2 + w_2 \hat{h}_1^* h_2)x$ (22)

$\hat{h}_2^* r_{dp} = \hat{h}_2^*(w_1 h_1 + w_2 h_2)x = (w_2|h_2|^2 + w_1 h_1 \hat{h}_2^*)x$ (23)

In step 566, the two processed diversity signals from the MRC block 304 for each base station may be despread by the DS block 306. The output of the DS block 306 may be communicated to the DP block 308 and the PCP blocks 310 and 312. In step 568, the PCP blocks 310 and 312 may determine partial channel estimates $\hat{h}_{dp1}$ and $\hat{h}_2$ from the dedicated pilot signals transmitted by the two transmit antennas by projecting (or correlating) equations 22 and 23 with respect to the variable x:

$\hat{h}_{dp1} = (w_1|h_1|^2 + w_2 \hat{h}_1^* h_2)_{dp}$ (24)

$\hat{h}_{dp2} = (w_2|h_2|^2 + w_1 h_1 \hat{h}_2^*)_{dp}$ (25)

In step 570, the DP block 308 may multiply the partial channel estimates in equations 22 and 23 by $\hat{h}_{dp1}^*$ and $\hat{h}_{dp2}^*$, respectively, to derive the partial symbol estimates $\hat{s}_1$ and $\hat{s}_2$, respectively.

$$\begin{aligned}
\hat{s}_1 &= \hat{h}_{dp1}^* \hat{h}_1^* r \\
&= (w_1|h_1|^2 + w_2 \hat{h}_1^* h_2)_{dp}^*(w_1|h_1|^2 + w_2 \hat{h}_1^* h_2)s \\
&= (|w_1|^2|h_1|^4 + |w_2|^2|h_1|^2|h_2|^2 + 2\mathrm{Re}(w_2 \hat{h}_1^* h_2))s
\end{aligned}$$ (26)

$$\begin{aligned}
\hat{s}_2 &= \hat{h}_{dp2}^* \hat{h}_2^* r \\
&= (w_2|h_2|^2 + w_1 h_1 \hat{h}_2^*)_{dp}^*(w_2|h_2|^2 + w_1 h_1 \hat{h}_2^*)s \\
&= (|w_2|^2|h_2|^4 + |w_1|^2|h_1|^2|h_2|^2 + 2\mathrm{Re}(w_1 \hat{h}_1^* h_2))s
\end{aligned}$$ (27)

The symbol estimate $\hat{s}$ may be generated by adding together the partial symbol estimates $\hat{s}_1$ and $\hat{s}_2$:

$\hat{s} = \hat{s}_1 + \hat{s}_2 = (|w_1|^2|h_1|^4 + |w_2|^2|h_1|^2|h_2|^2 + 2\mathrm{Re}(w_2 \hat{h}_1^* h_2) + |w_2|^2|h_2|^4 + |w_1|^2|h_1|^2|h_2|^2 + 2\mathrm{Re}(w_1 \hat{h}_1^* h_2))s$ (28)

Figure 6:
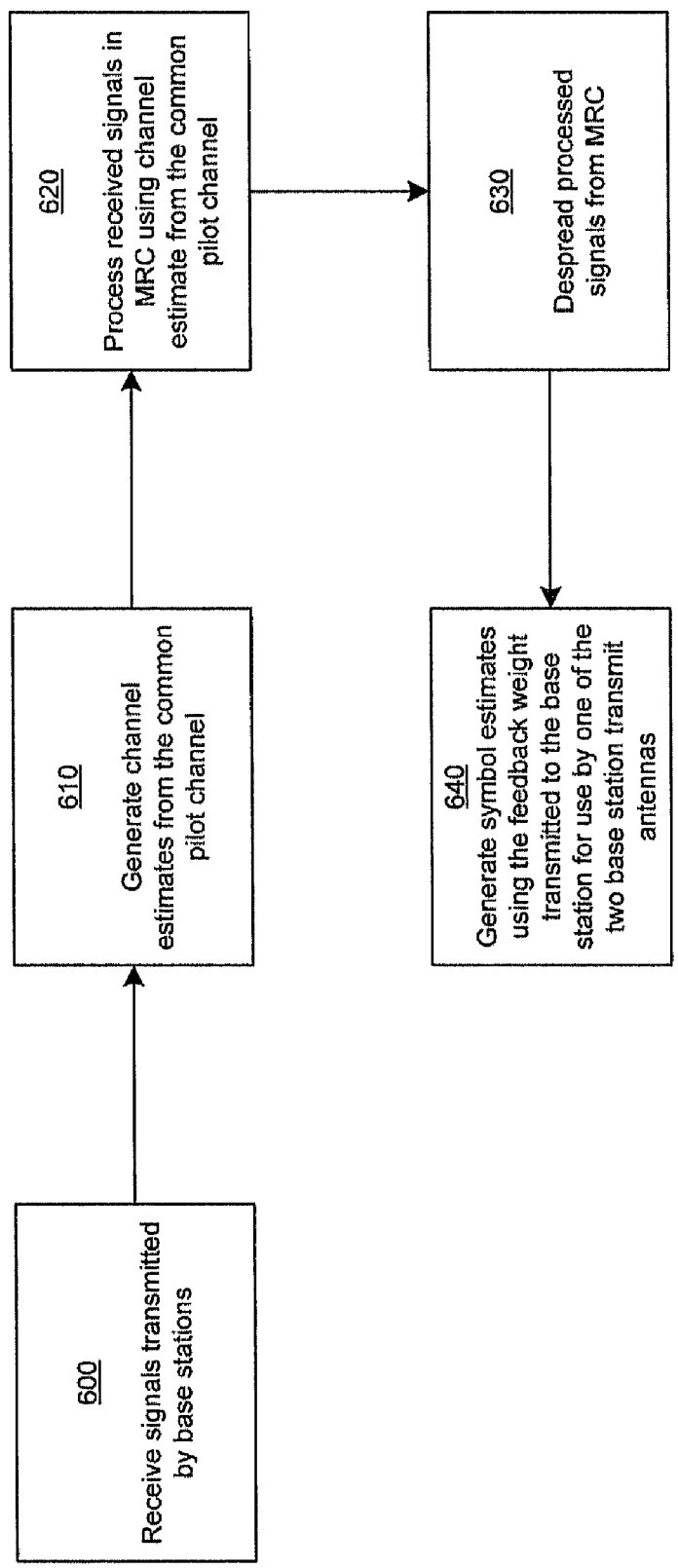
FIG. 6 is an exemplary flow diagram illustrating diversity processing using a closed loop 1 blind method, in accordance with an embodiment of the invention.

FIG. 6 is an exemplary flow diagram illustrating diversity processing using a closed loop 1 blind method, in accordance with an embodiment of the invention. The closed loop 1 blind method may use a feedback weight transmitted to a base station to generated estimates of symbols transmitted by the base station, rather than using an estimate of the transmit weight used by one of the two transmit antennas. Accordingly, closed loop 1 blind method may not be able to compensate for any differences between the weight transmitted by the mobile terminal and the transmit weight actually used by the base station. Referring to FIG. 6, the steps 600 to 640 may be utilized to process diversity signals. The steps 600, 610, 620, and 630 may be similar to the steps 500, 502, 504, and 506, respectively.

In step 640, the DP block 308 may generate symbol estimates ŝ by using the weight w that was transmitted to the base station:

$$\begin{aligned}\hat{s} &= \hat{h}_1^* r + \hat{w}^* \hat{h}_2^* r \\ &= \hat{h}_1^*(h_1 + wh_2)s + \hat{w}^* \hat{h}_2^*(h_1 + wh_2)s \\ &= (|h_1|^2 + w\hat{h}_1^* h_2 + w^* h_1 \hat{h}_2^* + |w|^2 |h_2|^2)s \\ &= (|h_1|^2 + 2\text{Re}(w\hat{h}_1^* h_2) + |w|^2 |h_2|^2)s\end{aligned} \quad (29)$$

It may be noted that the result of equation 29 may be equivalent to performing standard channel plus transmit weight de-rotation:

$$\begin{aligned}\hat{s} &= (\hat{h}_1 + w\hat{h}_2)^*(h_1 + wh_2)s \\ &= (|h_1|^2 + w\hat{h}_1^* h_2 + w^* h_1 \hat{h}_2^* + |w|^2 |h_2|^2)s \\ &= (|h_1|^2 + 2\text{Re}(w\hat{h}_1^* h_2) + |w|^2 |h_2|^2)s\end{aligned} \quad (30)$$

Figure 7:
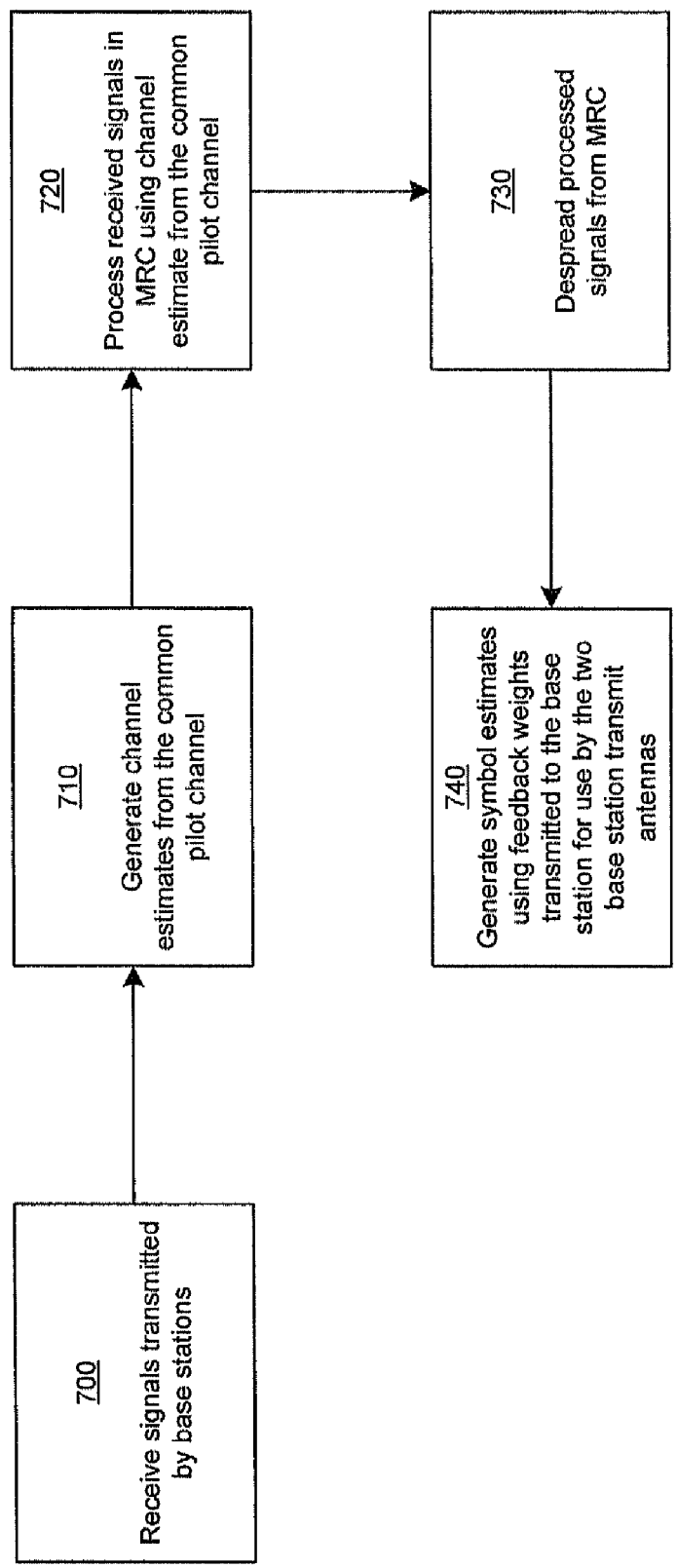
FIG. 7 is an exemplary flow diagram illustrating diversity processing using a closed loop 2 blind method, in accordance with an embodiment of the invention.

FIG. 7 is an exemplary flow diagram illustrating diversity processing using a closed loop 2 blind method, in accordance with an embodiment of the invention. The closed loop 2 blind method may use the feedback weights transmitted to a base station to generate estimates of the symbols transmitted by the base station, rather than using estimates of the transmit weights used by the two transmitted antennas at the base station. Accordingly, the closed loop 2 blind method may not be able to compensate for any differences between the weights transmitted by the mobile terminal and the transmit weights actually used by the base station. Referring to FIG. 7, the steps 700 to 740 may be utilized to process diversity signals. The steps 700, 710, 720, and 730 may be similar to the steps 560, 562, 564, and 566, respectively.

In step 740, the DP block 308 may generate symbol estimate ŝ by using the weights $w_1$ and $w_2$ that were transmitted to the base station:

$$\hat{s} = w_1^* \hat{h}_1^* r + w_2^* \hat{h}_2^* r = (|w_1|^2 |h_1|^2 + 2\text{Re}(w_1^* w_2 \hat{h}_1^* h_2) + |w_2|^2 |h_2|^2)s \quad (31)$$

In equations 17, 26, 27, 28, 29, and 31, expressions following the second equality sign are mathematical expansions. For implementation purposes it may be sufficient to implement expression preceding the second equality sign.

In accordance with an embodiment of the invention, aspects of an exemplary system may comprise circuitry, for example, antenna 210, that enables reception of a plurality of WCDMA/HSDPA multipath signals transmitted by, for example, each diversity transmit antenna 204a and 204b at the base station 202. A signal processing circuitry, for example, the MRC block 304, may enable combining of the WCDMA/HSDPA multipath signals to at least one processed diversity signal, at least a portion of which may be despread. The received WCDMA/HSDPA multipath signals may have originated from the diversity transmit antennas 204a and 204b, where the base station 202 may be transmitting via a closed loop or open loop (STTD) diversity transmission mode. Estimation of the closed loop symbols transmitted by the diversity transmit antennas 204a and 204b may be made based on information from at least one dedicated pilot channel transmitted by the transmit antennas 204a and 204b. Estimation of the open loop symbols transmitted by the diversity transmit antennas 204a and 204b may be made based on information from at least one common pilot channel transmitted by the transmit antennas 204a and 204b.

The closed loop diversity transmission mode may comprise WCDMA/HSDPA closed loop 1 (CL1) mode. For example, when the base station 202 is transmitting in the CL1 mode, the pilot channel processing circuitry, for example, the PCP blocks 310 and 312, may generate partial channel estimates. The PCP blocks 310 and 312 may project (or correlate) each of the processed diversity signals for the base station with respect to dedicated pilot channel information from each of the diversity transmit antennas 204a and 204b at the base station 202. The PCP blocks 310 and 312 may generate a weight based on the partial channel estimates. The AV block 314 may then estimate a transmit weight based on the generated weight. The estimation may comprise mapping the generated weight to one of a plurality of weights. An estimation of the symbols transmitted by the diversity transmit antennas 204a and 204b may be made by the diversity processing circuitry, for example, the DP block 308, based on the estimated transmit weight.

The closed loop diversity transmission mode may also comprise WCDMA closed loop 2 mode. When the base station 202 is transmitting in CL 2 mode, the PCP blocks 310 and 312 may generate partial channel estimates by projecting (or correlating) each of the processed diversity signals with respect to a dedicated pilot channel information. The DP block 308 may make estimates of partial transmitted channel symbols based on the generated partial channel estimates. The DP block 308 may then generate estimated transmitted symbols from the base station 202 by combining the estimated partial transmitted channel symbols. The DP block 308 may also make estimates of the transmitted symbols from the base station 202 based on feedback weights that may be communicated back to the base station 202.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for signal processing in a wireless receiver, the method comprising:
   receiving a plurality of multipath signals in an open loop diversity transmission mode, wherein said multipath signals are received from a plurality of diversity transmit antennas of a base station;
   combining at least a portion of said plurality of received multipath signals for each of said plurality of diversity transmit antennas to form at least one processed diversity signal; and
   estimating transmitted symbols from said at least one processed diversity signal based on information from at least one common pilot channel.

2. The method according to claim 1, comprising despreading at least a portion of said at least one processed diversity signal.

3. The method according to claim 1, wherein said multipath signals comprise WCDMA/HSDPA multipath signals.

4. The method according to claim 1, wherein said base station is operable to support WCDMA/HSDPA based accessibility.

5. The method according to claim 1, wherein said open loop diversity transmission mode comprises WCDMA/HSDPA space-time transmit diversity (STTD) mode.

6. The method according to claim 1, wherein said common pilot channel is transmitted via one or more of said plurality of diversity transmit antennas.

7. The method according to claim 1, comprising generating time varying impulse response estimates for a plurality of channels that are utilized for propagating said plurality of multipath signals.

8. The method according to claim 7, comprising generating said time varying impulse response estimates based on said information from said at least one common pilot channel.

9. The method according to claim 7, comprising generating said processed diversity signal based on said time varying impulse response estimates and/or timing information for said base station.

10. A system for signal processing in a wireless receiver, the system comprising:
    one or more circuits that are operable to receive of a plurality of multipath signals in an open loop diversity transmission mode, wherein said multipath signals are received from a plurality of diversity transmit antennas of a base station;
    said one or more circuits are operable to combine at least a portion of said plurality of received multipath signals for each of said plurality of diversity transmit antennas to form at least one processed diversity signal; and
    said one or more circuits are operable to estimate transmitted symbols from said at least one processed diversity signal based on information from at least one common pilot channel.

11. The system according to claim 10, wherein said one or more circuits are operable to despread at least a portion of said at least one processed diversity signal.

12. The system according to claim 10, wherein said multipath signals comprise WCDMA/HSDPA multipath signals.

13. The system according to claim 10, wherein said base station is operable to support WCDMA/HSDPA based accessibility.

14. The system according to claim 10, wherein said open loop diversity transmission mode comprises WCDMA/HSDPA space-time transmit diversity (STTD) mode.

15. The system according to claim 10, wherein said common pilot channel is transmitted via one or more of said plurality of diversity transmit antennas.

16. The system according to claim 10, wherein said one or more circuits are operable to generate time varying impulse response estimates for a plurality of channels that are utilized for propagating said plurality of multipath signals.

17. The system according to claim 16, wherein said one or more circuits are operable to generate said time varying impulse response estimates based on said information from said at least one common pilot channel.

18. The system according to claim 16, wherein said one or more circuits are operable to generate said processed diversity signal based on said time varying impulse response estimates and/or timing information for said base station.

* * * * *